United States Patent
Fu

(10) Patent No.: US 10,198,378 B2
(45) Date of Patent: Feb. 5, 2019

(54) FASTER DATA TRANSFER WITH SIMULTANEOUS ALTERNATIVE REMOTE DIRECT MEMORY ACCESS COMMUNICATIONS

(71) Applicant: Microsoft Technology Licensing, LLC, Redmond, WA (US)

(72) Inventor: Chen Fu, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/355,977

(22) Filed: Nov. 18, 2016

(65) Prior Publication Data

US 2018/0143924 A1    May 24, 2018

(51) Int. Cl.
| | |
|---|---|
| G06F 13/28 | (2006.01) |
| G06F 3/06 | (2006.01) |
| H04L 29/08 | (2006.01) |
| G06F 13/10 | (2006.01) |
| H04L 12/925 | (2013.01) |

(52) U.S. Cl.
CPC .............. *G06F 13/28* (2013.01); *G06F 3/061* (2013.01); *G06F 3/065* (2013.01); *G06F 3/067* (2013.01); *G06F 3/0613* (2013.01); *G06F 3/0656* (2013.01); *G06F 13/102* (2013.01); *H04L 47/722* (2013.01); *H04L 67/06* (2013.01); *H04L 67/2842* (2013.01)

(58) Field of Classification Search
CPC ........ G06F 13/28; G06F 3/061; G06F 3/0613; G06F 3/0656
See application file for complete search history.

(56) References Cited

U.S. PATENT DOCUMENTS

| | | |
|---|---|---|
| 7,917,597 B1 | 3/2011 | Lentini |
| 7,953,085 B2 | 5/2011 | Chang et al. |
| 8,024,417 B2 | 9/2011 | Mehrotra |
| 8,250,165 B2 | 8/2012 | Hefty et al. |
| 8,903,935 B2 | 12/2014 | Grant et al. |

(Continued)

OTHER PUBLICATIONS

""Fossies"—The Fresh Open Source Software Archive", Published on: May 23, 2016 Available at: http://fossies.org/linux/berkeley_upc/gasnet/gemini-conduit/README.

(Continued)

*Primary Examiner* — Glenn A. Auve
(74) *Attorney, Agent, or Firm* — The Watson I.P. Group, PLC; Vladan M. Vasiljevic

(57) ABSTRACT

Two computing devices utilizing remote direct memory access to exchange digital data across a computer network can utilize existing registered memory and can transmit the digital data in slices, one after another while simultaneously registering a larger quantity of memory and, when complete, the rest of the digital data can be transmitted as a single block. Completion of the memory registration triggers a notification comprising a token, providing the sending computing device with direct access to the registered memory on the receiving computing device, and further a quantity of the digital data that has already been properly received via the slices. On the sending computing device, the registered memory is that from which the digital data is being sliced, and, on the receiving computing device, that into which the digital data is being reassembled from the slices.

20 Claims, 5 Drawing Sheets

(56) References Cited

U.S. PATENT DOCUMENTS

| | | | |
|---|---|---|---|
| 2004/0049600 A1 | 3/2004 | Boyd et al. | |
| 2006/0168092 A1 | 7/2006 | Makhervaks et al. | |
| 2008/0235409 A1 | 9/2008 | Ryzhykh | |
| 2008/0313364 A1* | 12/2008 | Flynn | G06F 1/183 710/31 |
| 2009/0157995 A1* | 6/2009 | Kalmuk | G06F 13/28 711/170 |
| 2013/0007180 A1* | 1/2013 | Talpey | H04L 47/39 709/212 |
| 2015/0089009 A1 | 3/2015 | Tsirkin et al. | |

OTHER PUBLICATIONS

"Issues Related to RPC-over-RDMA Internode Round-trip draft-dnoveck-nfsv4-rperdma-rtissues-00", Published on: Apr. 17, 2016 Available at: https://tools.ietf.org/html/draft-dnoveck-nfsv4-rpcrdma-rtissues-00.

Ou, et al., "An efficient design for fast memory registration in RDMA", In Journal of Network and Computer Applications, vol. 32, Issue 3, May 2009, pp. 642.651.

Bell, et al., "A New DMA Registration Strategy for Pinning-Based High Performance Networks", In Proceedings of 17th International Parallel and Distributed Processing Symposium, Apr. 22, 2003, pp. 1-10.

Balaji, et al., "Advanced Flow-control Mechanisms for the Sockets Direct Protocol over InfiniBand", In Proceedings of the International Conference on Parallel Processing, Sep. 10, 2007, pp. 1-21.

Liu, et al., "High Performance RDMA-Based MPI Implementation over InfiniBand", In Proceedings of the 17th Annual ACM International Conference on Supercomputing, Jun. 23, 2003, 10 pages.

Tezuka, et al., "Pin-down Cache: A Virtual Memory Management Technique for Zero-copy Communication", In Proceedings of the 12th. International Parallel Processing Symposium on International Parallel Processing Symposium, Apr. 1998, pp. 1-7.

* cited by examiner

FASTER DATA TRANSFER WITH SIMULTANEOUS ALTERNATIVE REMOTE DIRECT MEMORY ACCESS COMMUNICATIONS

BACKGROUND

Computing devices can exchange digital data through communications transmitted across computer networks to which such computing devices are communicationally coupled via network interface hardware. Traditionally, to communicate digital data from a sending computing device to a receiving computing device across a network, network interface hardware of the sending computing device receives a copy of the digital data to be transmitted, and then transmits such digital data, in accordance with relevant network communication protocols, to the receiving computing device, whose network interface hardware receives the digital data, a copy of which can then be further made, on the receiving computing device, in order to enable processes, executed by a general-purpose central processing unit of such a receiving computing device, to access the received data. Consequently, the transmission of digital data can involve the making of multiple copies of such data, both at the sending computing device, and at the receiving computing device.

Remote direct memory access communications can enable a sending computing device to transmit data without first making a copy of such data for the network interface hardware on such a sending computing device. Instead, remote direct memory access communications can enable the network interface hardware of a sending computing device to access data directly from memory in which such data was stored by an application program seeking to transmit such data across the network. Remote direct memory access communications can also enable the network interface hardware of the sending computing device to write data directly into the memory of a receiving computing device, via the network interface hardware of the receiving computing device, but without making an additional copy on the receiving computing device.

Remote direct memory access communications rely on registered memory due at least in part to the direct reading of data out of memory by the network interface hardware of the sending computing device and the writing of data directly into the memory of the receiving computing device by the same network interface hardware. Because of such direct reading of data, the underlying memory cannot have its contents changed by other processes. However, registered memory cannot be paged to disk and, as such, ties up physical Random Access Memory (RAM) that can be at a premium in certain systems. Consequently, remote direct memory access communications only register small quantities of memory for send and receive buffers, and then slice up larger quantities of data to fit such smaller buffers, and then transmit the slices one at a time. Larger buffers can be registered to transmit larger quantities of data at one time, but such registration processes take so long that efficiencies gained by transmitting the larger quantities of data in a single communication are negated by the length of time taken to register the buffers to do so.

SUMMARY

Two computing devices utilizing remote direct memory access to exchange digital data across a computer network can utilize existing registered memory and can transmit the digital data in slices, one after another. Simultaneously, a larger quantity of memory can be registered and, when such a registration is complete, the rest of the digital data can be transmitted in a single communication. Completion of the memory registration can trigger a notification that can comprise a token, providing the sending computing device with direct access to the registered memory on the receiving computing device, and can further include a quantity of the digital data that has already been properly received via the slices The larger quantity of memory requested to be registered can be, on the sending computing device, the memory from which the digital data is being sliced, and, on the receiving computing device, the memory into which the digital data is being reassembled from the slices. A predetermined threshold can delineate between quantities of digital data that are likely too small to benefit from such optimization, and larger quantities of digital data to which such mechanisms are to be applied.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
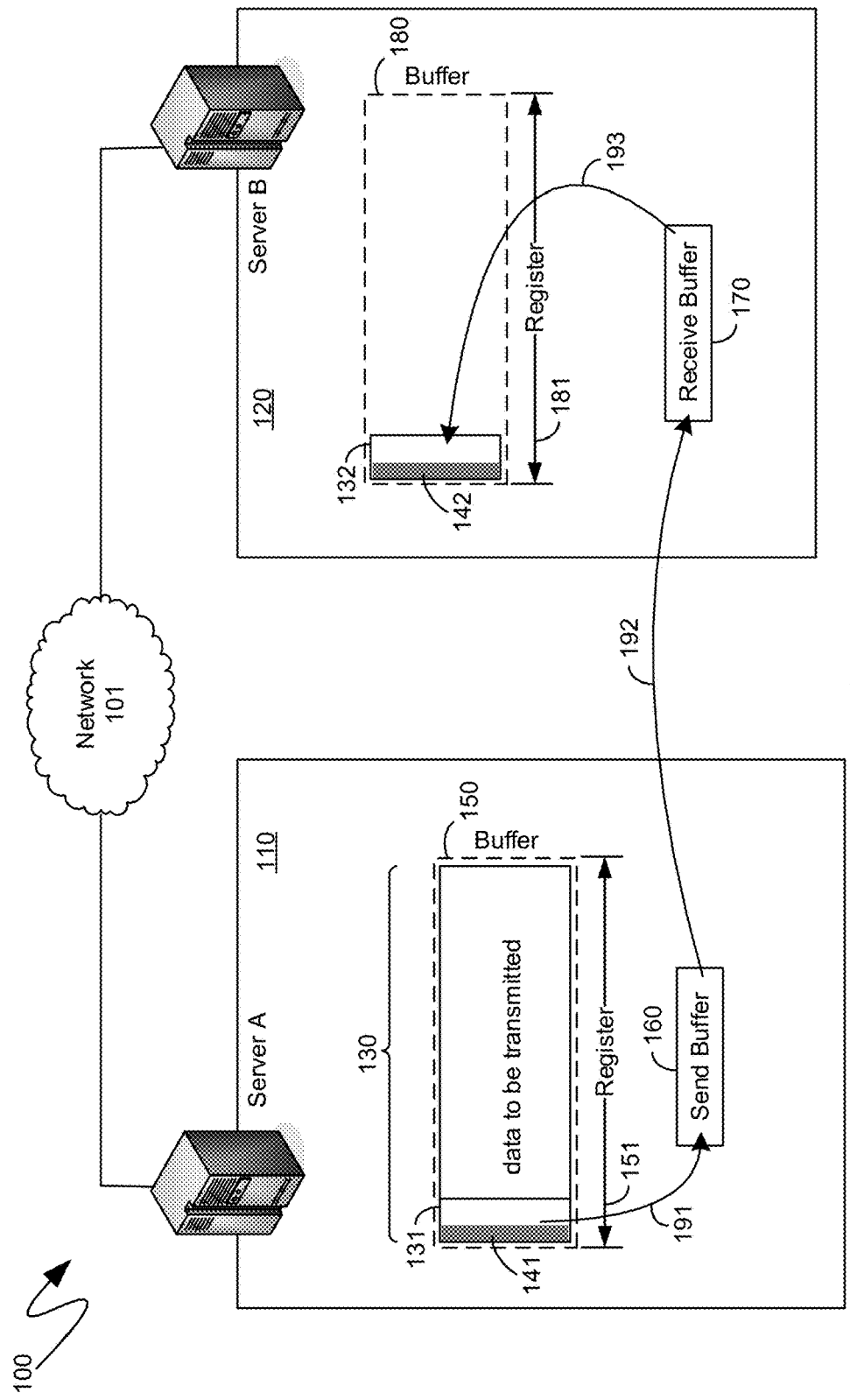
FIG. 1 is a block diagram of an exemplary data communication between computing devices.

The following description relates an optimized mechanism by which larger quantities of digital data can be transferred between computing devices utilizing remote direct memory access. Existing registered memory, which would have been registered when the remote direct memory access communication was initially established, can be utilized to transmit portions the digital data in slices, one after another. Simultaneously, a larger quantity of memory can be registered and, when such a registration is complete, the rest of the digital data can be transmitted as a single block. Completion of the memory registration can trigger a notification that can comprise a token, providing the sending computing device with direct access to the registered memory on the receiving computing device, and can further include a quantity of the digital data that has already been properly received via the slices. The larger quantity of memory that is requested to be registered can be, on the sending computing device, the memory from which the digital data is being sliced, and, on the receiving computing device, the memory into which the digital data is being reassembled from the slices. A predetermined threshold can delineate between quantities of digital data that are likely too small to benefit from such optimization, and larger quantities of digital data to which such mechanisms are to be applied.

The techniques described herein make reference to Remote Direct Memory Access (RDMA) communications. However, the mechanisms described are not limited to that specific communicational mechanism, and can be utilized with any mechanism by which two or more discrete and independent computing devices can communicationally transfer digital data between them by writing data directly into the other's memory.

Although not required, some of the descriptions below will be in the general context of computer-executable instructions, such as program modules, being executed by a computing device, including, specifically, by either general-purpose central processing units, or customized processing units, such as would be found on a network interface card that can be considered to be part of the computing device executing the computer-executable instructions. More specifically, the description will reference acts and symbolic representations of operations that are performed by one or more computing devices, peripherals, or combinations thereof, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, servers, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is shown therein comprising two discreet computing devices in the form of the exemplary server computing device 110 and the exemplary server computing device 120. For purposes of the descriptions below, the exemplary computing devices 110 and 120 are illustrated as being communicationally coupled to one another through a network 101. Although detailed further below, the makeup, structure and nature of the exemplary network 101 are immaterial to the descriptions below, and the mechanisms described herein, except to the extent that the exemplary network 101 enables the computing devices that are communicationally coupled therethrough, such as the exemplary computing devices 110 and 120, to perform the actions, and exchange the communications, detailed below.

Within the context of the exemplary system 100 of FIG. 1, as part of the establishment of a communicational channel, in accordance with the mechanisms detailed herein, between the exemplary computing device 110 and the exemplary computing device 120, the exemplary computing device 110 can set aside a portion of its memory to be treated as a send buffer, such as exemplary send buffer 160. As will be recognized by those skilled in the art, such a registration of memory can comprise the passing of a token, from the processes establishing, and maintaining, the memory of the send buffer 160, to, for example, a network interface card, or network communication processes executing on the exemplary computing device 110. Analogously, exemplary computing device 120 can set aside a portion of its memory to be treated as a receive buffer, such as the exemplary receive buffer 170, and, analogously, the network interface card, or network communication processes executing on exemplary computing device 120, can receive a token, such as from the process establishing, and maintaining, the memory of the receive buffer 170, that can provide access to data stored within the receive buffer 170. Again, as detailed above, the establishment of communications between, for example, exemplary computing devices 110 and 120 shown in FIG. 1, can entail each computing device to set aside portions of its memory to be treated as both a send buffer and, separately, a receive buffer, on each computing device. However, for purposes of illustrative and descriptive simplicity, only the exemplary send buffer 160, on the sending computing device, namely the exemplary computing device 110 in the illustrated example, and only the exemplary receive buffer 170, on the receiving computing device, name the exemplary computing device 120 in the illustrated example, are specifically shown in the figures, such as in FIG. 1.

Although not specifically illustrated in FIG. 1, as part of the establishment of the communicational channel between the exemplary computing devices 110 and 120, the exemplary computing device 120 can provide to the relevant processes on the exemplary computing device 110, such as to networking processes, or to the network interface card itself, the token that can enable the exemplary computing device 110, or, more specifically, the network interface card of the exemplary computing device 110, to directly access those portions of the memory of the exemplary computing device 120 that have been established as the exemplary receive buffer 170. In addition, each of the computing devices can exchange with the other information indicative of starting addresses, within their memory, of the send buffer 160 and receive buffer 170, respectively, as well as the size of those buffers.

As indicated previously, because of the direct reading and writing of data by, for example, the network interface card, the underlying memory which is registered as the send buffer 160, or the receive buffer 170, for example, cannot have its contents changed by other processes. Registered memory cannot be paged to disk and, as such, ties up physical Random Access Memory (RAM) that can be at a premium in certain systems. Consequently, remote direct memory access communications only register small quantities of memory for send and receive buffers, and then slice up larger quantities of data to fit such smaller buffers, and then transmit the slices one at a time. Thus, for example, each of the send buffer 160 and the receive buffer 170 can be only 32 KB in size. As another example, they can be 64 KB in size. Consequently, should data larger than, for example, 64 KB in size be transferred between the exemplary computing device 110 and the exemplary computing device 120, such data can first be sliced into slices not greater than 64 KB in size, and can then be copied, one slice at a time, into, for example, the send buffer 160, from which such a slice can be read, such as by the network interface card itself, and copied across the network 101 directly into the memory of the exemplary computing device 120, namely the memory registered as the receive buffer 170. Such a direct memory access is illustrated by the arrow 192. Subsequently, relevant processes executing on the exemplary computing device 120 can copy the data out of the receiver buffer 120 and into some other memory location.

For purposes of the descriptions below, the exemplary computing device 110 can comprise a large quantity of data to be transferred, in the form of the data 130. As utilized herein, the adjective "large", as applied to a quantity of data, refers to a quantity of data that is of sufficient size as to be able to achieve efficiencies in its transfer, from one computing device to another, such as through remote direct memory access communications, by utilizing the mechanisms described herein. Initially, the data 130 that is to be transferred can have a header 141 appended to it that can comprise metadata about the data 130 that is to be transferred. In particular, the header 141 can comprise size information indicating a size of the data 130.

For purposes of transferring the data 130, portions, or "slices" of the data 130 can be read from a memory location in which the data 130 is currently stored, and can be copied to the send buffer 160, such as is illustrated by the arrow 191. Each portion, or slice, of the data 130 can be sized so as to fit within the send buffer 160. For example, if the send buffer is 64 KB in size, then each slice of the data 130, such as, for example, the slice 131, can be no larger than 64 KB in size. According to one aspect, the first slice 131 can comprise the header 141. Consequently, when the first slice 131 is copied to the send buffer 160, as illustrated by the arrow 191, and is then written directly into the receive buffer 170, as illustrated by the arrow 192, the computing device 120 can receive information, in the form of the header 142, representing the copy of the header 141 as received by the computing device 120, of the quantity of data 130 that is to be transferred.

Subsequent to the receipt of the header 141, received the copy 142, processes executing on the computing device 120 can set aside a portion of memory, such as in the form of the exemplary buffer 180, that can be sized so as to be sufficiently large as to accommodate all of the data 130, based upon the size information contained in the header 142 that was received. As subsequent slices of the data 130 are received in the receive buffer 170, they can be copied out of the receive buffer 170, and into the buffer 180, such as is illustrated by the arrow 193. In such a manner, the data 130 can eventually be copied across the network 101 and can be reassembled in the buffer 180 in memory on the computing device 120.

According to one aspect, however, while such slicing of the data 130, and the transmission of such slices, is proceeding, such as in the manner detailed above, additional memory registration processes can be performed in parallel to such operations. More specifically, processes executing on the computing device 110 can request, such as of the operating system of the computing device 110, that the memory in which the data 130 is currently stored, and from which it is being sliced and copied into the send buffer 160, that that memory be registered. Within the exemplary system 100 shown in FIG. 1, the data 130 is shown as being stored in a buffer 150, which can represent a location in the memory of the computing device 110 in which the data was originally stored, such as by an application, or a location into which the memory was copied for purposes of transmission of the data 130 across the network 101. The request to register such data is illustrated by the indicator 151.

As will be recognized by those skilled in the art, the registration of memory may not be a fast process such that multiple slices of the data 130 may be generated and transmitted through the already registered and existing send buffer 160 and receive buffer 170. However, once the memory supporting the buffer 150 is registered, the data 130 can be read directly from such memory without the need to copy slices of it to the send buffer 160. Typically, such a registration of memory results in the provision of a token by which data stored within, for example, the buffer 150, can be meaningfully accessed. Thus, the receipt of such a token can indicate the completion of the memory registration process, again represented by the indicator 151 in FIG. 1.

Analogously, after the computing device receiving data, such as, for example, the exemplary server computing device 120 shown in FIG. 1, and analogous memory registration request, represented by the indicator 181, can be triggered. More specifically, and as indicated previously, receipt of the header 142 can provide processes executing on the computing device 120 with information indicative of the quantity of data 130 that is to be transmitted. With such information, those processes can request that a portion of the memory of the computing device 120 be set aside for purposes of assembling the data 130, or, more accurately, a copy thereof, on the computing device 120, from the slices being received through the receive buffer 170, such as exemplary slice 132, which can be a copy of the slice 131, as received from the computing device 110. The portion of the memory of the computing device 120 that can be set aside to hold a copy of the data 130 can be in the form of the buffer 180.

According to one aspect, therefore, processes executing on the computing device 120 can request that the memory supporting the buffer 180 be registered in a manner analogous to that detailed above with respect to the buffer 150 on the computing device 110. Such a registration request is graphically illustrated in FIG. 1 with the indicator 181. As with the registration request described above, the request to register the memory of the buffer 180 can result in the provision of a token by which the data stored in those memory addresses can be meaningfully accessed.

Figure 2:
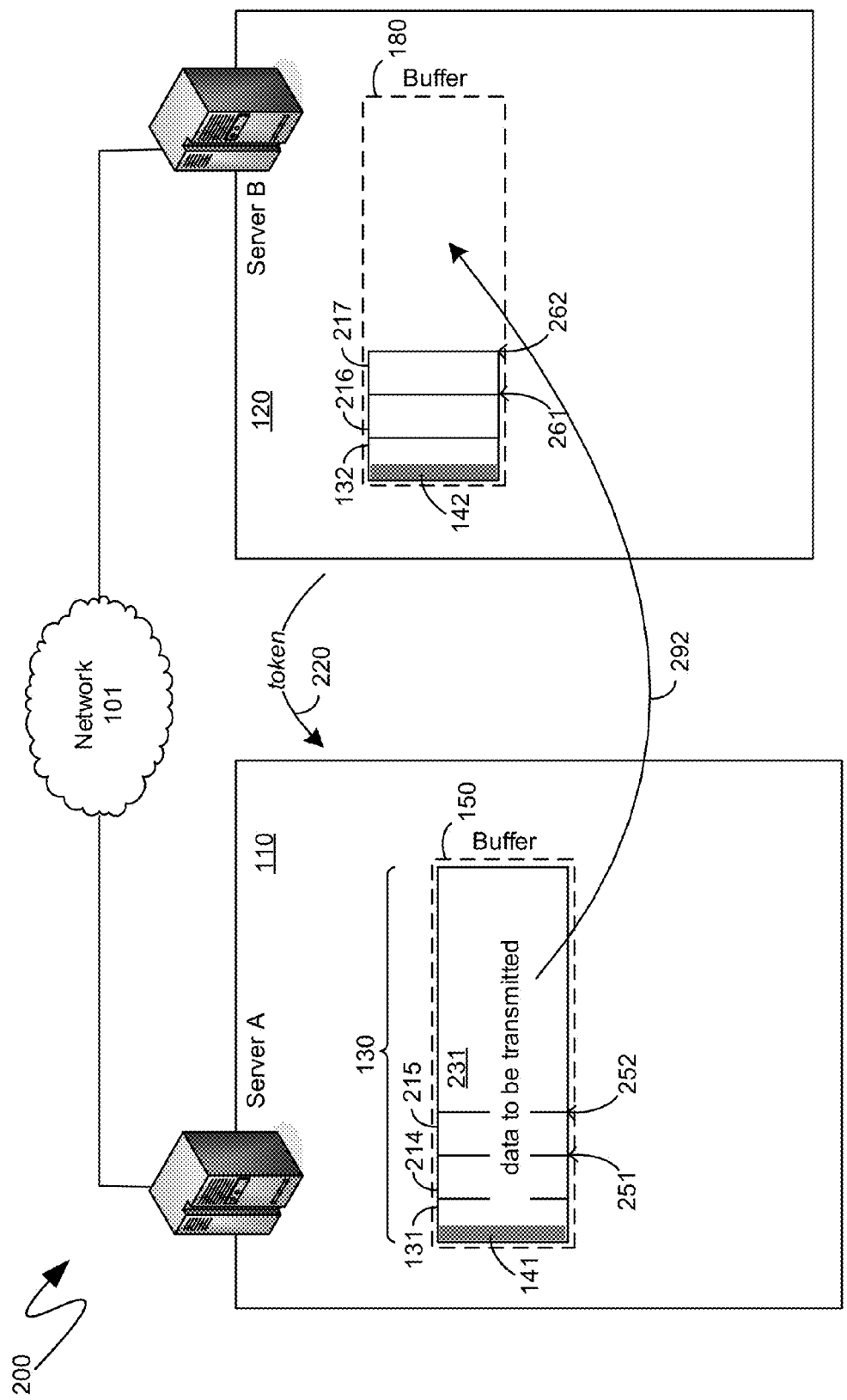
FIG. 2 is a block diagram of another aspect of an exemplary data communication between computing devices.

Once the token corresponding to the registration of the memory of the buffer 180 is received, at the computing device 120, such a token can be provided to processes executing on the computing device 110, together with other relevant memory address information as detailed further below. Turning to FIG. 2, the exemplary system 200 shown therein illustrates a provision of the token, from the computing device 120, to the computing device 110, in the form of the communication 220. Although not specifically illustrated, communication 220 can include the provision of other relevant memory address information, as will be described in detail below. With such a token, the computing device 110, such as, for example, a network interface card of the computing device 110, can write data directly into the memory of the computing device 120 that supports the buffer 180. Consequently, rather than slicing the data 130, the remainder of the data can simply be read from the buffer 150 and written directly into the buffer 180 as a single communication or transfer, as represented by the communication 292. Such a single communication 292 can be much more efficient than the multiple communications of multiple slices, and can result in a greater quantity of data being transferred from the computing device 110 to the computing device 120 within a reduced amount of time.

However, as indicated previously, the registration of memory can take some time to complete. Thus, by the time the registration of the memory supporting the buffer 180 is complete, the token is received by the requesting process on the computing device 120, and then communicated to the computing device 110, such as via the communication 220, multiple slices of data, such as exemplary slices 214 and 215, can have already been read from the buffer 150, through the aforementioned send and receive buffers, and into the buffer 180, illustrated in the system 200 of FIG. 2 as the copies 216 and 217 of the slices 214 and 215, respectively. Accordingly, according to one aspect, when reading data directly from the buffer 150, and into the buffer 180, only a portion 231 of the data 130 can be so transferred. The portion 231, as illustrated in FIG. 2, can be that portion of the data 130 that had not yet been transferred through the slicing mechanism described above.

The portion 231 can be determined by the computing device 110, the computing device 120, or combinations thereof. For example, the computing device 120 can provide a beginning memory address location, representing a beginning of the buffer 180 that has been registered. Such information can then be utilized by processes executing on the computing device 110 to determine a "write commence address" into which to begin writing the portion 231 as copied to the computing device 120. More specifically, processes executing on the computing device 110 can determine that slices 131, 214 and 215 representing, for example, 192 KB, can have already been utilizing the slicing mechanisms detailed above. Consequently, processes executing on the computing device 110 can determine that the portion 231 can be the remainder of the data 130 after excluding the first 192 KB. Similarly, the processes executing on the computing device 110 can determine that the write commence address at which the copy of the portion 231 is to start being written into the buffer 180 can be the address that is 192 KB beyond the beginning memory address location received from the computing device 120.

As another example, the computing device 120 can itself determine the write commence address, such as by determining how many of the slices, such as exemplary slices 132, 216 and 217 have already been received and copied into the buffer 180. Thus, for example, if the computing device 120 determines that the slices 132, 216 and 217 have already been received and copied into the buffer 180, the computing device 120 can determine that the write commence address is the address that is 192 KB beyond the beginning memory address location of the buffer 180. In such an example, while the computing device 120 can communicate the beginning memory address of the buffer 182 the computing device 110, such as part of the communication 220, the computing device 120 can also directly specify the determined write commence address, such as part of the communication 220.

It is possible that a slice, such as, for example, the slice 215, can be in the process of being communicated between the computing device 110 and the computing device 120 when the computing device 120 provides the token via the communication 220. In such an instance, the computing device 120 can perceive that the write commence address can be at, for example, the memory location 261, after the slice 216, which can be a copy of the slice 214. The memory location 261 can correspond to the memory location 251 in the buffer 150. Conversely, because the slice 215 can be in the process of being transmitted to the computing device 120, the computing device 110 can perceive that the write commence address can be at, for example, the memory location 252, after the slice 215. The memory location 252 in the buffer 150 can correspond to the memory location 262 in the buffer 180. In such an instance, if processes executing on the computing device 110 determine the write commence address, the portion 231 can be read from the buffer 150, commencing with the memory location 252, and a copy thereof can then be written into the buffer 180, commencing at memory location 262. The copy 217, of the slice 215, may not have been received by the computing device 121, for example, by the time the communication 220 was generated, but the copy 217 can eventually arrive in the buffer 180, and, upon completion of the copy of the portion 231, as illustrated by the arrow 292, the buffer 180 can comprise a complete copy of the data 130. Conversely, if processes executing on the computing device 120 determine the write commence address, it can be determined to be the memory location 261, corresponding to the location 251 in the buffer 150 on the computing device 110. Communication of such a write commence address, such as via the communication 220, can result in the computing device 110 copying, as a single transmission, the data of both the slice 215 and the portion 231. In such an instance, commencing the writing of such data at the memory location 261 can result in the copy 217 being overwritten should it have arrived in the interim. However, because the memory between the locations 261 and 262 being overwritten, namely the copy 217, would be the same, such overwriting should have no negative implications, other than the transmission of one slice of data twice. Consequently, as can be seen, either computing device can determine the write commence address.

According to one aspect, the processes described can be performed only for data, such as exemplary data 130, that is greater than a predetermined size. For example, sufficiently small data may be completely transmitted through slicing before the registration of the memory of the buffers 150 and 180 is complete. As such, the processing effort invested in such memory registration, on both the computing device 110 and the computing device 120, can have been wasted. To prevent such waste, a predetermined threshold can be established that can represent a quantity of data such that a meaningful portion of such data can remain un-transmitted by the time the aforementioned memory registration process is complete, leaving a meaningful portion of such data as the portion 231 it still remains to be transmitted, and can be transmitted in a single communication, such as exemplary communication 292. Alternatively, or in addition, the communication of a portion of data as a single communication can be undertaken only if the remaining portion, such as the portion 231 of the data 130, exceeds a predetermined threshold, such as a predetermined threshold quantity of data, a predetermined threshold percentage of the overall quantity of data 130, or other like predetermined thresholds.

Once the data 130 has been copied to the computing device 120, a notification can be provided to processes executing on the computing device 120 that the transmission of the data 130 has completed. Upon receipt of such notification, processes executing on the computing device 120 can inform an application that the data within the buffer 180 is available for the application to access. For example, an application can have registered a callback, an interrupt, or other like notification mechanism by which such an application can be notified when the new data is received and verified. Once such an application is notified of the new data, the application can copy the data out of the buffer 180 and into application memory. Alternatively, the application can consume the data in some other manner, such as directly from the buffer 180, and can otherwise provide a notification that the data no longer needs to be retained in the buffer 180. Once the application has copied the data out of the buffer 180, or has otherwise provided notification that the data no longer needs to be retained in the buffer 180, the buffer 180 can be de-registered so that the memory can be utilized for other processing.

Figure 3:
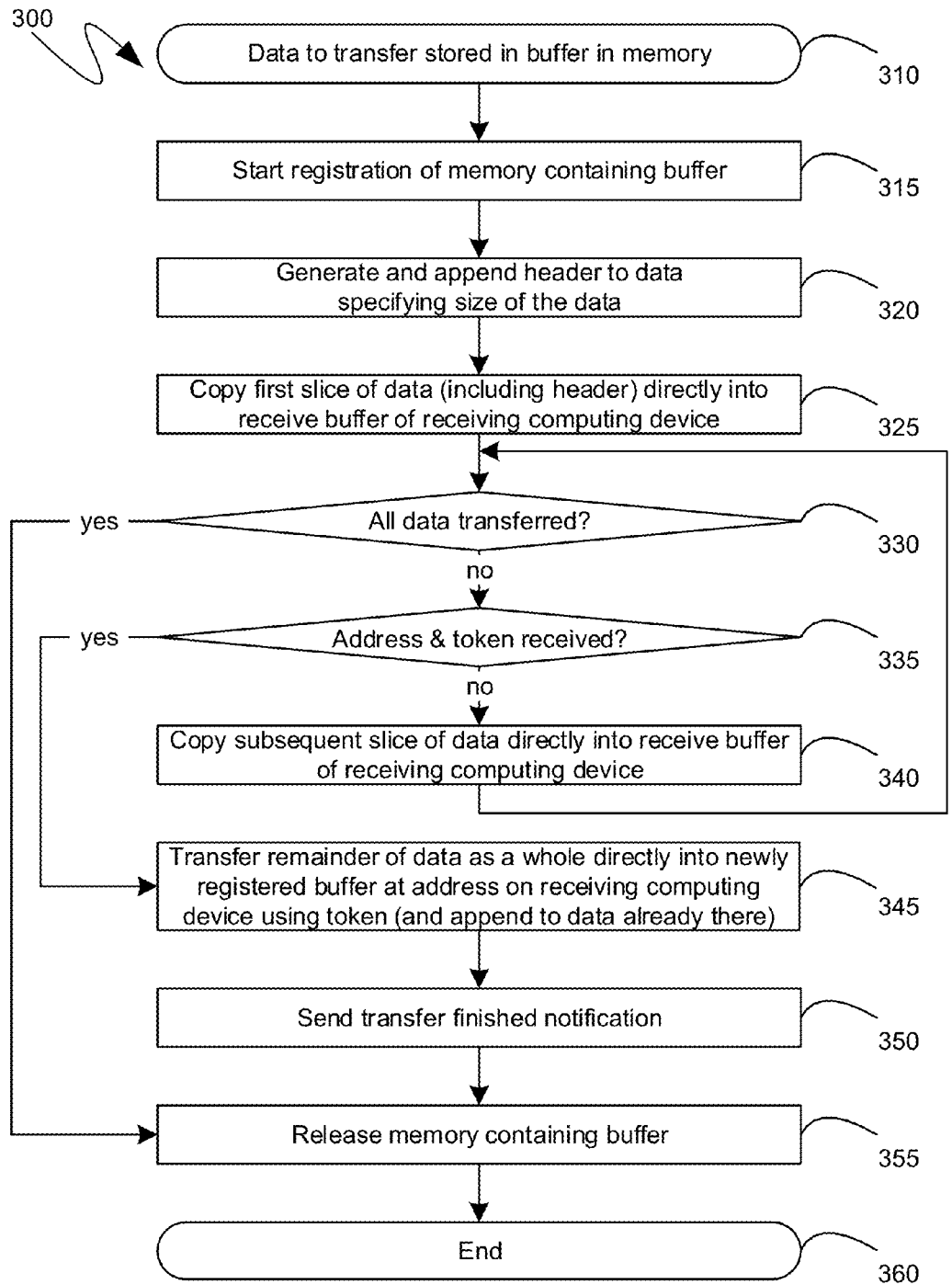
FIG. 3 is a flow diagram of an exemplary data communication between computing devices.

Turning to FIG. 3, the exemplary flow diagram 300 shown therein illustrates an exemplary series of steps, such as can be performed by processes executing on a sending computing device, including processes executing on, or otherwise performed by, a network interface card of the sending computing device. Initially, at step 310, data that is to be transferred across a network, such as by remote direct memory access mechanisms, can be stored in the buffer in the memory of the sending computing device. Subsequently, at step 315, a request can be made, such as to the operating system of the sending computer device, to register the memory containing the buffer from step 310. While the memory registration request is being operated upon, a header can be generated, such as at step 320, and appended to the data. As indicated previously, such a header can comprise an indication of the size, or quantity, of the data to be transferred. Such a header can also comprise other metadata including, for example, error detecting codes, such as Cyclic Redundancy Check (CRC) codes, and other metadata. At step 325, transmission of the data from step 310 can commence utilizing existing communicational mechanisms. For example, when an initial communication channel between the sending and receiving computing devices was established, a channel which can have already been in use for multiple prior data communications, the establishment of such a communication channel can have entailed the registering of send and receive buffers. However, such send and receive buffers can be smaller than the data from step 310. To transfer the data from step 310 through such buffers, the data can be partitioned, or divided, into slices, or portions, of the data that are no larger than the size of the pre-registered buffers. Such slices can then be copied into a pre-registered send buffer, and then copied from there directly into a pre-registered receive buffer on a receiving computing device. Consequently, at step 325, the first slice, which can include the header generated and appended to the data at step 320, can be copied directly into the pre-registered receive buffer of the receiving computing device.

At step 330, a determination can be made as to whether all of the data, from step 310, has already been transferred. If, at step 330, is determined that all of the data has not been transferred, processing can proceed to step 335, at which point a determination can be made as to whether a memory address location and a memory access token have been received from the receiving computing device. If, at step 335, it is determined that no such address and token have been received, processing can proceed to step 340 and a subsequent slice of the data can be obtained and copied, such as from the sender buffer on the sending computing device, that is performing the steps of exemplary flow diagram 300, directly into a receive buffer of a receiving computing device. Processing can then return to step 330 to determine if all the data has now been transferred. If, at step 330, all of the data has been transferred, processing can proceed with step 355, at which point the memory requested to be registered at step 315 can be de-registered, or otherwise released for utilization by other processes. The relevant processing can then end at step 360.

At step 335, when the address and token are received from the receiving computing device, processing can then transition to step 345. As detailed above, receipt of the address of a buffer in the memory of the receiving computing device, and the token by which data within such a buffer can be meaningfully accessed, can enable the sending computing device to transfer the remainder of the data from the buffer in which the data is stored, such as at step 310, directly into the buffer identified by the memory address provided. Although not specifically illustrated in the exemplary flow diagram 300, prior to the bulk transfer of remainder of the data, not previously transferred through the slicing of step 340, a determination can be made as to whether the memory registration requested at step 315 has completed. Typically, such a registration would have already completed, and can enable the direct access to facilitate the transfer of step 345 from the buffer in which the data is stored at step 310 to the buffer registered at the receiving computing device, whose token was received at step 335. Once the remaining data is transferred, as a single communication, at step 345, the transfer finished notification can be transmitted at step 350. Steps 355 and 360 can then be executed, as detailed above.

Figure 4:
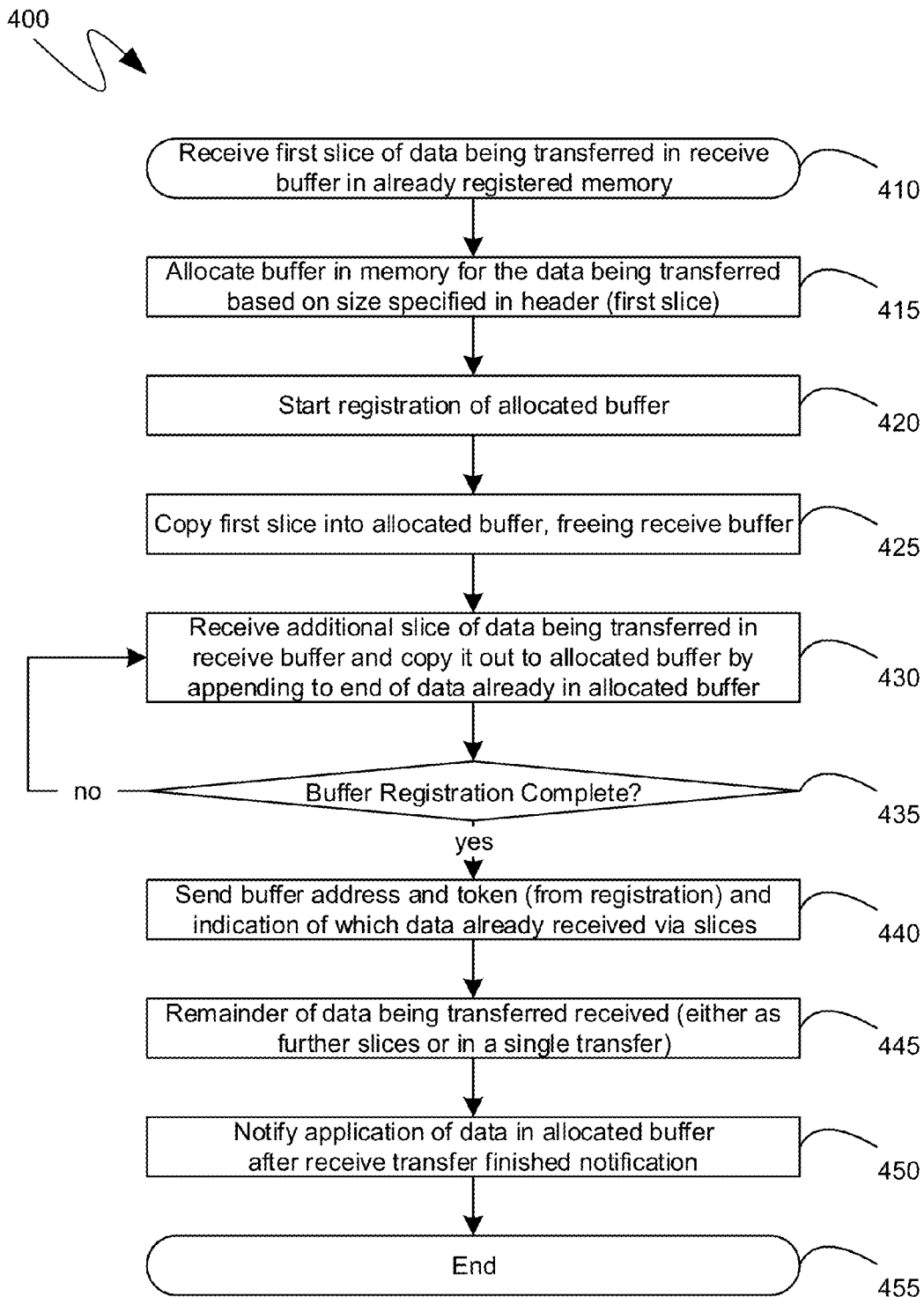
FIG. 4 is a block diagram of another aspect of an exemplary data communication between computing devices.

Turning to FIG. 4, the exemplary flow diagram 400 shown therein illustrates an exemplary series of steps, such as can be performed by a receiving computing device, including by processes executing on such a receiving computing device, a network interface card of the receiving computing device, or combinations thereof. Initially, at step 410, a first slice of data can be received in a receive buffer, which can be pre-registered, as detailed above, and the receipt of such a first slice can be in accordance with existing communicational channels established previously. Subsequently, at step 415, the data of the first slice, received at step 410, can be examined, a header identified therein, and the size of the data to be transferred can be obtained from such a header. Additionally, at step 415, a portion of the memory of the receiving computing device, in the form of a buffer, can be allocated in accordance with such size information, to be able to accommodate the data to be transmitted. Processing can then proceed to step 420, at which point a registration of the allocated buffer can be requested, such as an operating system of the computing device executing the steps of the flow diagram 400.

At step 425, the first slice of data, received at step 410, can be copied into the buffer allocated at step 450, thereby freeing the receive buffer for additional slices of data. Processing can then proceed with step 430, to receive additional slices of data into the receive buffer, and copy them out to the buffer allocated at step 415 by appending such newly received slices to the end of data from slices already received and stored in the allocated buffer. The operation of step 430 can, therefore, proceed in a traditional manner. At step 435, determination can be made if the registration of the allocated buffer, requested that step 420, has completed. If, at the 435, it is determined that such a registration has not yet completed, processing can continue with step 430. Once such a buffer registration is complete, as determined at step 435, processing can proceed with step 440, at which point the computing device performing the steps of the flow diagram 400 can send a token, received from such a buffer registration, requested at step 420, along with additional information, such as to a sending computing device. According to one aspect, some of the additional information that can be provided, at step 440, can include a beginning memory address at which the buffer allocated at step 415, and registered, is located. According to another aspect, some of the additional information that can be provided, at step 440, can include a write commence address that can identify which data has already been received via slices, such as at step 430, and is already stored in the buffer. Processing can then proceed to step 445, at which point data can be received directly into the buffer allocated at step 415 and since registered. The receipt of data, at step 445, can be as a single communication. At step 450 a notification can be received that the data in the allocated buffer is complete, and also as part of step 450, such a notification can trigger notification to an application indicating that the data is available for the application in the buffer. Once the application has copied the data out of the buffer, or has otherwise completed its utilization of the data within the buffer, it can notify, such as the processes performing the steps of the flow diagram 400, that the storage of the data in the buffer is no longer required. The buffer can then be deregistered, and such memory be made available for other processes. The relevant processing can then end at step 455.

Although not specifically illustrated, according to one aspect, the registered buffers, such as the exemplary buffers 150 and 180, shown in FIGS. 1 and 2, need not be explicitly deregistered after completion of the transmission of data originally stored in such buffers. Instead, such buffers can be reused. More specifically, much in the same way that the send and receive buffers were already registered and able to be used to transmit data using remote direct memory access mechanisms without waiting for a subsequent registration, the larger buffers registered by the aforedescribed processes can, likewise, be utilized in subsequent communications. Because these larger buffers can consume substantially more memory, they may not be able to be retained indefinitely. But, if additional data having sufficient quantity to benefit from such larger buffers is continuing to be sent, or if the relevant processes are made aware of the intent to send such quantities of data in the future, then the registered buffers can remain registered and not be de-registered until a later point in time.

Figure 5:
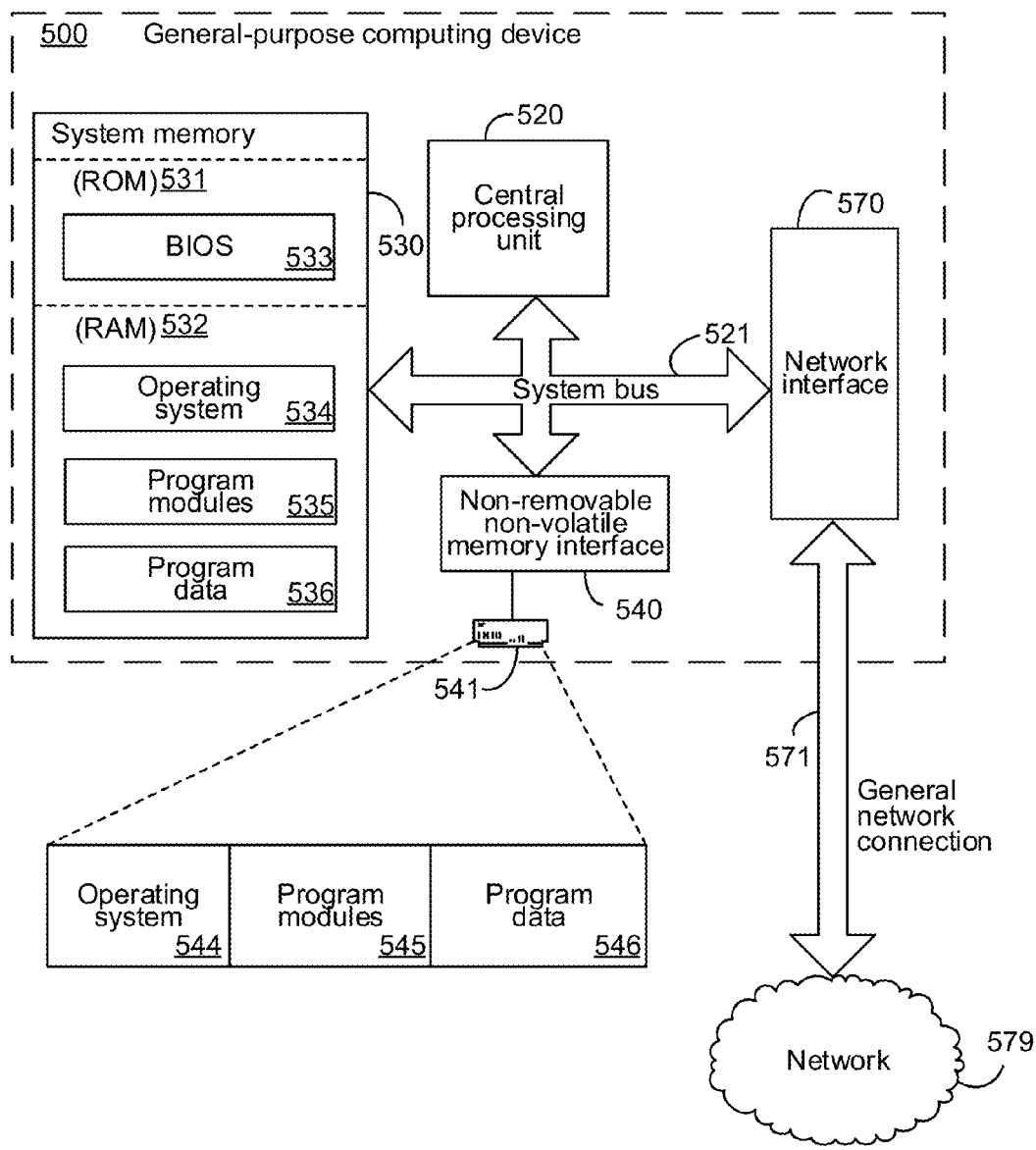
FIG. 5 is a block diagram of an exemplary computing device.

Turning to FIG. 5, an exemplary computing device 500 is shown therein comprising one or more general-purpose processing units, such as the exemplary CPU 520, as well as a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. Depending on the specific physical implementation, one or more of the CPUs 520, the customized integrated circuit 550, the system memory 530 and other components of the computing device 500 can be physically co-located, such as on a single chip or silicon die or on a single circuit board. In such a case, some or all of the system bus 521 can be nothing more than silicon pathways within a single chip structure or on a single die and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Computer storage media, however, does not include communication media. Communication media embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, other program modules 535, and program data 536.

The computing device 500 may also include other removable/non-removable, volatile/nonvolatile computer storage media. By way of example only, FIG. 5 illustrates a hard disk drive 541 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media, as defined and delineated above. The hard disk drive 541 is typically connected to the system bus 521 through a non-volatile memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 may operate in a networked environment using logical connections to one or more remote computers. The computing device 500 is illustrated as being connected to the general network connection 571 through a network interface or adapter 570, which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 571. It will be appreciated that the network connections shown are exemplary and other means of establishing a communications link between computing devices may be used.

Although described as a single physical device, the exemplary computing device 500 can be a virtual computing device, in which case the functionality of the above-described physical components, such as the CPU 520, the system memory 530, the network interface 570, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 500 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a computing device comprising: one or more processing units; a network interface card; and one or more computer-readable media comprising computer-executable instructions, which, when executed by the processing units or the network interface card, cause the computing device to: register a first portion of memory that comprises a first data; generate a slice of the first data by reading some of the first data into a previously registered send buffer that is smaller than the first data; copy the slice from the send buffer into a receive buffer on a receiving computing device that was previously registered on the receiving computing device; repeat the generating and copying with subsequent slices of the first data until all of the first data has been transmitted or until a token is received from the receiving computing device, the token providing access to a second portion of memory on the receiving computing device that can accommodate all of the first data; and copy a rest of the first data, that has not already been sliced and copied into the receive buffer on the receiving computing device, from the first portion of memory into the second portion of memory on the receiving computing device using the token after the token is received and after the first portion of memory is registered.

A second example is the computing device of the first example, wherein the computer-readable media comprise further computer-executable instructions, which, when executed, cause the computing device to: modify the first data to include a header comprising a quantity of the first data; wherein a first slice of the first data is generated such that it includes the header.

A third example is the computing device of the first example, wherein the computer-executable instructions causing the copying the rest of the first data into the second portion of memory comprise further computer-executable instructions, which, when executed, cause the computing device to: copy the rest of the first data into the second portion of memory, on the receiving computing device, commencing at a write commence address, within the second portion of memory, at which previously sliced and copied portions of the first data, as stored within the second portion of memory on the receiving computing device, end.

A fourth example is the computing device of the third example, wherein the computer-readable media comprise further computer-executable instructions, which, when executed, cause the computing device to: receive, from the receiving computing device, the token and a starting address of the second portion of memory on the receiving computing device; and determine the write commence address from the starting address and a quantity of slices previously copied into the receive buffer on the receiving computing device.

A fifth example is the computing device of the third example, wherein the computer-readable media comprise further computer-executable instructions, which, when executed, cause the computing device to: receive, from the receiving computing device, a communication comprising the token and the write commence address as determined by the receiving computing device at a time when the communication was generated.

A sixth example is the computing device of the first example, wherein the computer-executable instructions causing the registering and the copying of the rest of the data are only executed if a size of the first data is greater than a pre-determined threshold size.

A seventh example is the computing device of the first example, wherein the computer-executable instructions causing the copying of the rest of the first data are only executed if a size of the rest of the first data is greater than a pre-determined threshold size.

An eighth example is a computing device comprising one or more processing units; a network interface card; and one or more computer-readable media comprising computer-executable instructions, which, when executed by the processing units or the network interface card, cause the computing device to: receive an indication of a quantity of a first data; register a first portion of memory to accommodate the first data; receive, into a receive buffer that was previously registered, slices of the first data, the receive buffer being smaller than the first data; copy the received slices of the first data from the receive buffer into the first portion of memory; transmit, to a sending computing device, a token providing access to the first portion of memory, the token having been received in response to a completion of the registering the first portion of memory; and receive, into the first portion of memory, a rest of the first data that has not already been received in slices and copied into the first portion of memory.

A ninth example is the computing device of the eighth example, wherein the computer-readable media comprise further computer-executable instructions, which, when executed, cause the computing device to: obtain the indication of the quantity of the first data from a header that is part of a first slice of the first data received into the receive buffer A tenth example is the computing device of the eighth example, wherein the computer-readable media comprise further computer-executable instructions, which, when executed, cause the computing device to: transmit, with the token, a starting address of the first portion of memory.

An eleventh example is the computing device of the eighth example, wherein the computer-readable media comprise further computer-executable instructions, which, when executed, cause the computing device to: transmit, with the token, a write commence address, within the first portion of memory, at which previously received and copied slices of the first data, as stored within the first portion of memory, end.

A twelfth example is the computing device of the eighth example, wherein the computer-readable media comprise further computer-executable instructions, which, when executed, cause the computing device to: notify an application of the first data in the first portion of memory only after receiving a transfer finished notification from the sending computing device.

A thirteenth example is a method of increasing data transfer speed in remote direct memory access data communications between a sending computing device and a receiving computing device, the method comprising: registering, on the sending computing device, a first portion of memory that comprises a first data; generating, on the sending computing device, slices of the first data by reading some of the first data into a previously registered send buffer that is smaller than the first data; copying the slices from the send buffer on the sending computing device into a receive buffer on the receiving computing device that was previously registered on the receiving computing device; receiving, at the receiving computing device, an indication of a quantity of the first data; registering, at the receiving computing device, a second portion of memory to accommodate the first data; receiving, at the receiving computing device, into the receive buffer, the slices of the first data, the receive buffer being smaller than the first data; copying, at the receiving computing device, the received slices of the first data from the receive buffer into the second portion of memory; transmitting, from the receiving computing device to the sending computing device, the token, the token having been generated on the receiving computing device in response to a completion of the registering the second portion of memory on the receiving computing device; copying, from the sending computing device, a rest of the first data, that has not already been sliced and copied into the receive buffer on the receiving computing device, from the first portion of memory into the second portion of memory on the receiving computing device using the token after the token is received by the sending computing device and after the first portion of memory is registered on the sending computing device; and receiving, at the receiving computing device, the rest of the first data into the second portion of memory.

A fourteenth example is the method device of the thirteenth example, further comprising: modifying, on the sending computing device, the first data to include a header comprising the quantity of the first data; and obtaining, by the receiving computing device, the indication of the quantity of the first data from the header; wherein the header is part of a first slice of the first data received into the receive buffer.

A fifteenth example is the method of the thirteenth example further comprising: copying, from the sending computing device, into the second portion of memory on the receiving computing device, the rest of the first data commencing at a write commence address, within the second portion of memory, at which previously sliced and copied portions of the first data, as stored within the second portion of memory on the receiving computing device, end.

A sixteenth example is the method of the fifteenth example further comprising: transmitting a starting address of the second portion of memory from the receiving computing device to the sending computing device; and determining, at the sending computing device, the write commence address from the starting address and a quantity of slices previously copied into the receive buffer on the receiving computing device by the sending computing device.

A seventeenth example is the method of the fifteenth example, further comprising: transmitting a communication comprising the write commence address from the receiving computing device to the sending computing device, the write commence address as determined by the receiving computing device at a time when the communication was generated.

An eighteenth example is the method of the thirteenth example, wherein the registering the first and second portions of memory and the copying of the rest of the data is only performed if a size of the first data is greater than a pre-determined threshold size.

A nineteenth example is the method of the thirteenth example, wherein the copying of the rest of the first data into the second portion of memory is only performed if a size of the rest of the first data is greater than a pre-determined threshold size.

A twentieth example is the method of the thirteenth example further comprising: notifying, at the receiving computing device, an application of the first data in the second portion of memory only after receiving a transfer finished notification from the sending computing device.

As can be seen from the above descriptions, faster data transfer with simultaneous alternative remote direct memory access data communications has been presented. In view of the many possible variations of the subject matter described herein, we claim as our invention all such embodiments as may come within the scope of the following claims and equivalents thereto.

I claim:

1. A computing device comprising:
  one or more processing units;
  a network interface card; and
  one or more computer-readable media comprising computer-executable instructions, which, when executed by the processing units or the network interface card, cause the computing device to:
    register a first portion of memory that comprises a first data;
    generate a slice of the first data by reading some of the first data into a previously registered send buffer that is smaller than the first data;
    copy the slice from the send buffer into a receive buffer on a receiving computing device, the receive buffer having been previously registered on the receiving computing device;
    repeat the generating and copying with subsequent slices of the first data until a token is received from the receiving computing device, the token providing access to a second portion of memory on the receiving computing device that can accommodate all of the first data; and
    copy, after the token is received and after the first portion of memory is registered, a rest of the first data, that has not already been sliced and copied into the receive buffer, from the first portion of memory into the second portion of memory on the receiving computing device using the token.

2. The computing device of claim 1, wherein the computer-readable media comprise further computer-executable instructions, which, when executed, cause the computing device to:
  modify the first data to include a header comprising a quantity of the first data;

wherein a first slice of the first data is generated such that it includes the header.

3. The computing device of claim 1, wherein the computer-executable instructions causing the copying of the rest of the first data into the second portion of memory comprise further computer-executable instructions, which, when executed, cause the computing device to:
copy the rest of the first data into the second portion of memory, on the receiving computing device, commencing at a write commence address, within the second portion of memory, at which previously sliced and copied portions of the first data, as stored within the second portion of memory on the receiving computing device, end.

4. The computing device of claim 3, wherein the computer-readable media comprise further computer-executable instructions, which, when executed, cause the computing device to:
receive, from the receiving computing device, the token and a starting address of the second portion of memory on the receiving computing device; and
determine the write commence address from the starting address and a quantity of slices previously copied into the receive buffer.

5. The computing device of claim 3, wherein the computer-readable media comprise further computer-executable instructions, which, when executed, cause the computing device to:
receive, from the receiving computing device, a communication comprising the token and the write commence address as determined by the receiving computing device at a time when the communication was generated.

6. The computing device of claim 1, wherein the computer-executable instructions causing the registering and the copying of the rest of the data are only executed if a size of the first data is greater than a pre-determined threshold size.

7. The computing device of claim 1, wherein the computer-executable instructions causing the copying of the rest of the first data are only executed if a size of the rest of the first data is greater than a pre-determined threshold size.

8. A computing device comprising:
one or more processing units;
a network interface card; and
one or more computer-readable media comprising computer-executable instructions, which, when executed by the processing units or the network interface card, cause the computing device to:
receive an indication of a quantity of a first data;
register a first portion of memory to accommodate the first data;
receive, into a receive buffer that was previously registered, slices of the first data, the receive buffer being smaller than the first data;
copy the received slices of the first data from the receive buffer into the first portion of memory;
transmit, to a sending computing device, a token providing access to the first portion of memory, the token having been received in response to a completion of the registering the first portion of memory; and
receive, into the first portion of memory, a rest of the first data that has not already been received in slices and copied into the first portion of memory.

9. The computing device of claim 8, wherein the computer-readable media comprise further computer-executable instructions, which, when executed, cause the computing device to:
obtain the indication of the quantity of the first data from a header that is part of a first slice of the first data received into the receive buffer.

10. The computing device of claim 8, wherein the computer-readable media comprise further computer-executable instructions, which, when executed, cause the computing device to:
transmit, with the token, a starting address of the first portion of memory.

11. The computing device of claim 8, wherein the computer-readable media comprise further computer-executable instructions, which, when executed, cause the computing device to:
transmit, with the token, a write commence address, within the first portion of memory, at which previously received and copied slices of the first data, as stored within the first portion of memory, end.

12. The computing device of claim 8, wherein the computer-readable media comprise further computer-executable instructions, which, when executed, cause the computing device to:
notify an application of the first data in the first portion of memory only after receiving a transfer finished notification from the sending computing device.

13. A method of increasing data transfer speed in remote direct memory access data communications between a sending computing device and a receiving computing device, the method comprising:
registering, on the sending computing device, a first portion of memory that comprises a first data;
generating, on the sending computing device, slices of the first data by reading some of the first data into a previously registered send buffer that is smaller than the first data;
copying the slices from the send buffer on the sending computing device into a receive buffer on the receiving computing device that was previously registered on the receiving computing device;
receiving, at the receiving computing device, an indication of a quantity of the first data;
registering, at the receiving computing device, a second portion of memory to accommodate the first data;
receiving, at the receiving computing device, into the receive buffer, the slices of the first data, the receive buffer being smaller than the first data;
copying, at the receiving computing device, the received slices of the first data from the receive buffer into the second portion of memory;
transmitting, from the receiving computing device to the sending computing device, a token, the token having been generated on the receiving computing device in response to a completion of the registering the second portion of memory on the receiving computing device;
copying, from the sending computing device, after the token is received by the sending computing device and after the first portion of memory is registered on the sending computing device, a rest of the first data, that has not already been sliced and copied into the receive buffer, from the first portion of memory into the second portion of memory on the receiving computing device using the token; and
receiving, at the receiving computing device, the rest of the first data into the second portion of memory.

14. The method of claim 13, further comprising:
modifying, on the sending computing device, the first data to include a header comprising the quantity of the first data; and
obtaining, by the receiving computing device, the indication of the quantity of the first data from the header;
wherein the header is part of a first slice of the first data received into the receive buffer.

15. The method of claim 13, further comprising:
copying, from the sending computing device, into the second portion of memory on the receiving computing device, the rest of the first data commencing at a write commence address, within the second portion of memory, at which previously sliced and copied portions of the first data, as stored within the second portion of memory on the receiving computing device, end.

16. The method of claim 15, further comprising:
transmitting a starting address of the second portion of memory from the receiving computing device to the sending computing device; and
determining, at the sending computing device, the write commence address from the starting address and a quantity of slices previously copied into the receive buffer on the receiving computing device by the sending computing device.

17. The method of claim 15, further comprising:
transmitting a communication comprising the write commence address from the receiving computing device to the sending computing device, the write commence address as determined by the receiving computing device at a time when the communication was generated.

18. The method of claim 13, wherein the registering the first and second portions of memory and the copying of the rest of the data is only performed if a size of the first data is greater than a pre-determined threshold size.

19. The method of claim 13, wherein the copying of the rest of the first data into the second portion of memory is only performed if a size of the rest of the first data is greater than a pre-determined threshold size.

20. The method of claim 13, further comprising:
notifying, at the receiving computing device, an application of the first data in the second portion of memory only after receiving a transfer finished notification from the sending computing device.

* * * * *